(12) United States Patent
Hoegener et al.

(10) Patent No.: US 6,633,278 B1
(45) Date of Patent: Oct. 14, 2003

(54) MINI CONTROLLER

(75) Inventors: Juergen Hoegener, Mondorf (DE); Wolfram Kress, Siegburg (DE); Olaf Dung, Hennef (DE)

(73) Assignee: Moeller GmbH, Bonn (DE)

( * ) Notice: Subject to any disclaimer, the term of this patent is extended or adjusted under 35 U.S.C. 154(b) by 0 days.

(21) Appl. No.: 09/555,337

(22) PCT Filed: Nov. 26, 1998

(86) PCT No.: PCT/DE98/03488

§ 371 (c)(1),
(2), (4) Date: May 26, 2000

(87) PCT Pub. No.: WO99/28794

PCT Pub. Date: Jun. 10, 1999

(30) Foreign Application Priority Data

Nov. 26, 1997 (DE) .......................... 197 52 255

(51) Int. Cl.$^7$ ................................. G09G 5/00
(52) U.S. Cl. ..................................... 345/172
(58) Field of Search .............. 200/52; 345/169, 345/156, 172; 712/247; D13/162.1

(56) References Cited

U.S. PATENT DOCUMENTS

| | | | |
|---|---|---|---|
| 3,964,026 A | * | 6/1976 | Yamauchi et al. ........ 340/172.5 |
| 5,613,115 A | * | 3/1997 | Gihl et al. ................... 395/701 |
| 5,659,705 A | | 8/1997 | McNutt et al. |

FOREIGN PATENT DOCUMENTS

| | | |
|---|---|---|
| DE | 32 22 305 | 12/1982 |
| EP | 0 092 312 | 10/1983 |
| EP | 0 251 699 | 1/1988 |
| EP | 0 477 760 | 1/1988 |
| EP | 0 435 188 | 7/1991 |
| WO | 89 1201 | 2/1989 |
| WO | 97 09661 | 3/1997 |

OTHER PUBLICATIONS

* Patent Abstracts of Japan, vol. 10, No. 288, Sep. 30, 1986 and JP 61 105605, (Fanuc ltd.) May 23, 1986.
* Patent Abstracts of Japan, vol. 12, No. 71, Mar. 5, 1988 and JP 62 210572, (Toshiba Corp.) Sep. 16, 1987.
Patent Abstracts of Japan, JP 8 77 872, Mar. 22, 1996 (Fuji Electric Co. Ltd.).
Röschke, "Das Maximum in Miniformat: Schalten und Steuern: Ganz einfach mit LOGO", Messen, Prüfen, Automatisieren (mpa) Jul./Aug. 1997; pp. 3,6,8,10 and 15.

* cited by examiner

*Primary Examiner*—Matthew C. Bella
*Assistant Examiner*—G. F. Cunningham
(74) *Attorney, Agent, or Firm*—Kenyon & Kenyon

(57) ABSTRACT

A mini controller has an intelligent central unit; a storage unit, an operating unit and a display unit. The display unit is subdivided into a sign matrix with n*m sign locations, each sign location in turn being formed by an x*y pixel matrix. Each sign location is associated with a particular type of object, so that only particular types of objects can be input and processed at particular sign locations. Sign locations are provided for at least one object of the operand type, of the connection type and of the assignment type. The object types, the momentary operand states and the resulting connection states are stored in an object assignment table, so that logic-forming current paths can be created by inputting in rows and/or columns the operand, connection and assignment objects into their associated sign locations.

9 Claims, 3 Drawing Sheets

| column (n) → ↓ line (m) | 0 | 1 | 2 | 3 | 4 | 5 | 6 | 7 | 8 | 9 | 10 | 11 |
|---|---|---|---|---|---|---|---|---|---|---|---|---|
| 0 | | | | | | | | | | | | |
| 1 | | | | | | | | | | | | |
| 2 | | | | | | | | | | | | |
| 3 | | | | | | | | | | | | |
| | | operand 0 | connection 0 | operand 1 | connection 1 | | operand 2 | connection 2 | | allocation | | |

6

| column (n) / line (m) | 0 | 1 | 2 | 3 | 4 | 5 | 6 | 7 | 8 | 9 | 10 | 11 |
|---|---|---|---|---|---|---|---|---|---|---|---|---|
| 0 | operand 0 | connection 0 | operand 1 | connection 1 | operand 2 | connection 2 | allocation | | | | | |
| 1 | | | | | | | | | | | | |
| 2 | | | | | | | | | | | | |
| 3 | | | | | | | | | | | | |

FIG. 2a

MINI CONTROLLER

FIELD OF THE INVENTION

The present invention relates to a mini-controller, in particular to a programmable and/or parameterizable controller, such as a logic relay, having at least the following integrated units: an intelligent central processing unit, a memory unit, an operating unit, and a display unit for implementing automation processes.

RELATED TECHNOLOGY

Devices of this kind are already known. The logic module of the firm Siemens (LOGO! manual, 1996, order no. 6ED1 050 1AA00-0DE0) is a programmable mini-controller of the species for managing smaller control tasks. The device also includes the integrated units described above. Here, the disadvantage is that the device's design makes programming complicated. The average user is unfamiliar with the procedure used to program devices of this kind, because a conventional wiring circuit diagram must be converted into logic symbols. However, the user must first familiarize himself with the completely strange and complicated operation of the device. Another drawback is the low information density available to the user due to the symbology and the only very small displays of such devices.

SUMMARY OF THE INVENTION

An object of the present invention is to devise a mini-controller, which offers a higher information density and renders possible a clearly simpler operation of the device.

The present invention provides a mini-controller, in particular a logic relay, having an intelligent central processing unit (2), a memory unit (8), an operating unit (4), and a display unit (6). The display unit (6) is subdivided into a character matrix of n*m character positions, and a specific object type having a fixed character length is assigned to each character position. The character positions are provided by columns for an operand object type, a connection object type, and for an allocation object type. The memory unit (8) has a non-volatile memory area for storing the various object types in an object allocation table, and a volatile memory area for storing the mapping of the character matrix. The various object types being able to be linked to one another in such a way that lines including current paths producing a logic array are formed on the display unit (6), and the mapping of the character matrix located in the volatile memory area of the memory unit (8) is able to be executed by the central processing unit (2). By permanently allocating specific object types to corresponding character positions of the n*m character matrix of the display unit, the input processes for operating the device become routine to the user within a very short time. In one preferred specific embodiment of the present invention, the individual object types are configured in the form of circuit diagram symbols. This enables even the inexperienced user to use the device according to the present invention intuitively. The need is eliminated for learning new symbols and programming techniques, which is time-consuming. Another advantage is the high information density attained by segmenting the display unit in a fixed manner and by integrating circuit diagram symbols.

BRIEF DESCRIPTION OF THE DRAWINGS

The present invention is explained in greater detail with reference to the drawings, in which:

FIG. 2a shows a partitioning of a display unit of the device in accordance with FIG. 1, in one possible variant.

DETAILED DESCRIPTION

Figure 1:
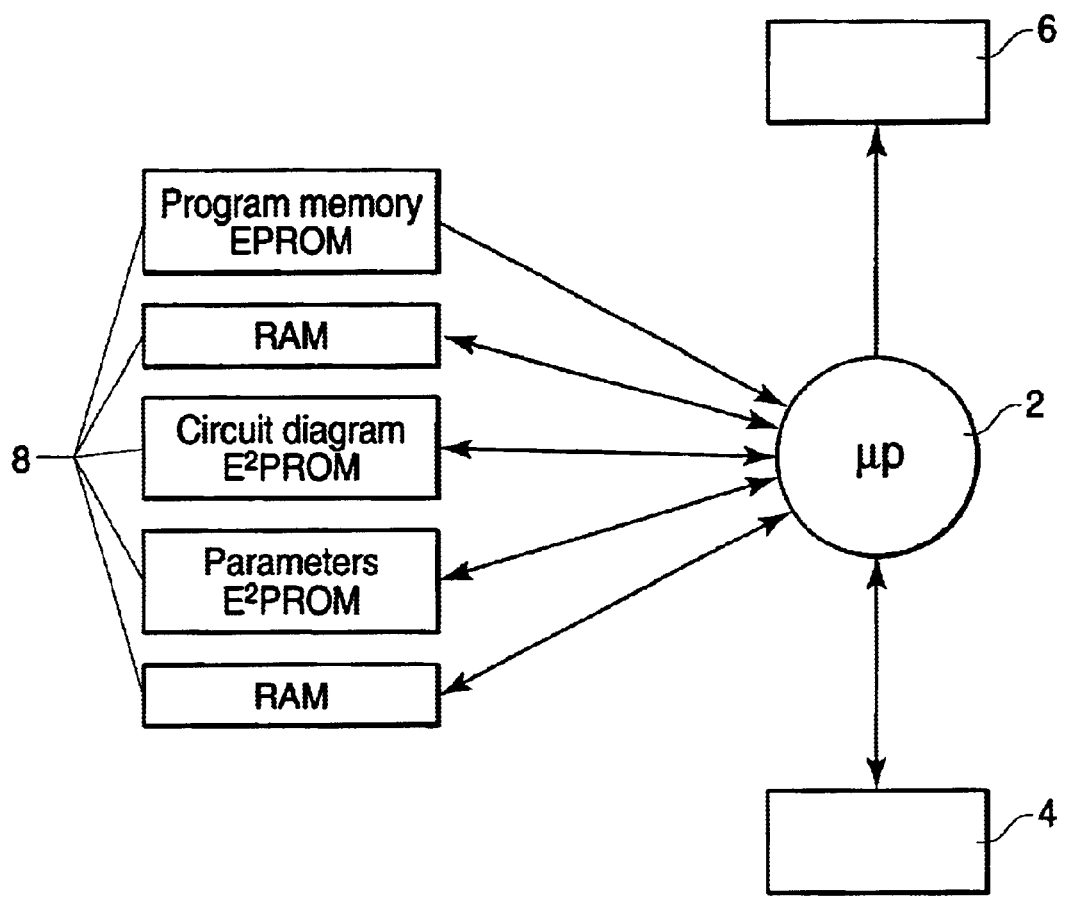
FIG. 1 show one possible specific embodiment of the controller according to the present invention, in a schematic representation.

FIG. 1 depicts the controller according to the present invention on the basis of an intelligent central processing unit 2, for example a microprocessor. In this context, central processing unit 2 preferably assumes the task of the entire control and communication within the device. Moreover, the minimum hardware requirements also necessitate an operating unit 4, a display unit 6, and a memory unit 8. The mentioned components are all integrated in the controller; an additional programming unit is no longer needed. Operating unit 4 is advantageously composed of merely four function keys and four direction keys. In this context, to input information (programming code in the form of circuit diagram symbols or their indices, or the like, and/or parameters), the four, preferably multiply assigned function keys "MF", "DEL", "ESC" and "OK" are provided. To position a cursor, provision is made for four direction keys, which are conceived as arrow keys and are offset from one another by 90°.

Display unit 6 includes a character matrix having n*m (n=columns, m=lines) character positions (preferably 4*12 characters, see FIG. 2), each character, in turn, being represented by x*y pixels (in this case, 5*8 pixels). Memory unit 8 has at least one non-volatile and non-writable program memory, designed, for example, as an EPROM (or as a PROM mask produced in the manufacturing of the microprocessor) for the actual operating system, as well as a non-volatile and writable memory, designed, for example, as an $E^2PROM$ for storage, for the user program, and for storing inputtable parameters for functional modules. In addition, memory unit 8 has a writable memory (can also be volatile) for storing the input and status data (input, output, flag, and functional module statuses) in an object allocation table during program execution. Furthermore, an additional, writable, temporary memory (e.g., RAM) is provided for mapping display unit 6.

Figure 2B:
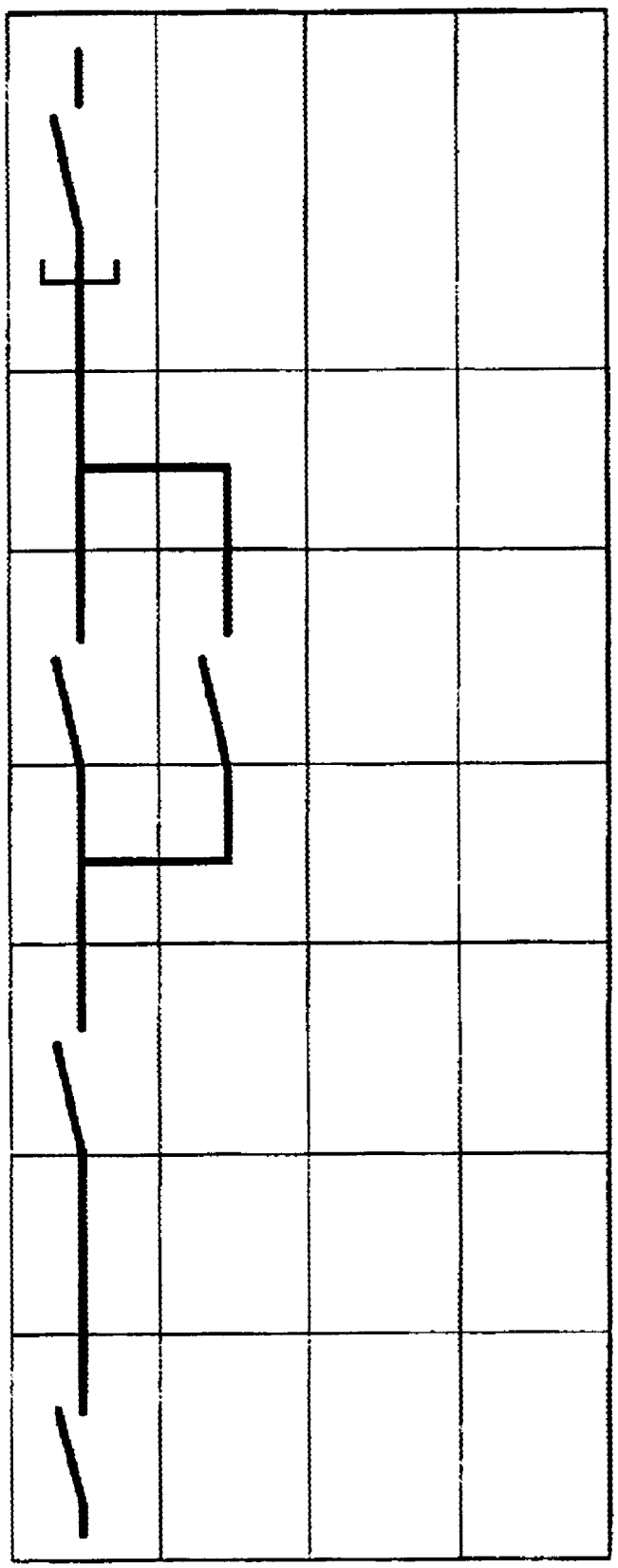
FIG. 2b shows the display unit in accordance with FIG. 2, featuring one possible programming path design, including circuit diagram symbols.

FIGS. 2a and 2b schematically depict the design layout of display unit 6, which is preferably conceived as an LCD display and is subdivided into a 4*12 character matrix. Using this display unit 6, which is particularly suited for mini-controllers, four lines are able to be displayed with 12 characters each. In this context, the present invention provides for a specific object type to be assigned to each character position (or to a group of character positions) of display unit 6, in such a way that only certain object types are able to be input and processed at specific character positions. Character positions are provided for at least one operand object type, one connection object type, and one allocation object type, the operand object type containing operands in the form of inputs, outputs (e.g., in the form of circuit diagram symbols and/or their indices) or functional modules (parameterizable and non-parameterizable).

Furthermore, an operand is provided in the form of a bridge, which establishes a connection between two connection objects at operand character positions. The various connection objects (of the connection object type) are configured in the form of rectilinear connections, intersections, T-connection pieces, and the like, while the assignment objects (of the assignment object type), in turn, are preferably configured as specially identified outputs, inputs, flags or the like. All objects of the operand object type and of the assignment object type can advantageously be displayed as break contacts or as make contacts or, analogously thereto, as a designation of the same (circuit diagram symbology). Any desired number of bytes to be processed is able to be allocated (object assignment table) to each of the character positions or object types. The individual object types (designation and data pertaining to contents), as well as the operating states prevailing at any one time, and the resultant connection states of the individual interconnection points between each of the operands, are stored in an object allocation table. In this context, the designations of the object types are stored in the form of invariable data, which are permanently assigned to individual positions of display unit 6, while all status-dependent data (operand states and connection states) are stored as variable data. Individual current paths which make up a logic array are able to be implemented by inputting, by row and/or column, operand objects, connection objects and allocation objects at each of the assigned character positions.

In the depicted exemplary embodiment, each 12-column row is conceived for seven object types. In this context, three operand object types, three connection object types, and one allocation object type are provided per line. The operand object types are displayed with two characters, the connection object types with one character, and the allocation object types with three characters, on display unit 6. To ensure that the object types are positionally bound to the character positions of display unit 6, fixed structural elements in the object allocation table, preferably located in the RAM memory, are assigned to the column positions of each row. From this table, which is composed of the mentioned line structure, multiplied by the permissible number of lines (yields the maximum permissible size of the user program), a 1:1 allocation (mapping) to the particular line context is able to be found. In this context, the display unit is used as a window of a four-line size, which is able to be moved over the object allocation table (scroll function). The individual object types are preferably allocated in the following manner to the individual columns of each line.

| operand object type: | operand 0 → column 0, 1 |
|---|---|
| | operand 1 → column 3, 4 |
| | operand 2 → column 6, 7 |
| connection object type: | connection 0 → column 2 |
| | connection 1 → column 5 |
| | connection 2 → column 8 |
| allocation object type: | allocation → column 9, 10, 11 |

The relations among the individual object types are conceivably simple. With respect to the operands, the rule applies: operand (n) in column position n*3 through n*3+1. For the connections, the rule applies: connection (n) in column position n*3+2. Since only one allocation object is able to be implemented per line, the position is clearly predefined with the mentioned columns 9, 10, 11. To implement program structures set up in this manner, a "current supply" is indispensable. For this purpose, an imaginary busbar is provided in a column (not shown) to make available a logic "1" supply signal for the first depicted column (column 0) in the line matrix (FIG. 2b).

The individual object types are constructed, in particular, as follows: operand object type—2 characters/1 byte; connection object type—1 character/1 byte; allocation object type—3 characters/1 byte. Allocating the individual resources in this fixed fashion minimizes the required memory space. Given, for example, a limitation of thirty lines and a memory space requirement of, for example, one byte per object type, this signifies an actual memory space requirement of 30*7 bytes—210 bytes. This basic memory space requirement increases correspondingly with the use of functional modules, such as timing circuits, counters, clock modules, and the like. In the case that parameterizable functional modules are used, an additional parameter table is provided for storing the corresponding parameters of the particular functional module. For the programming and display, in each case only the outputs, i.e., the break contacts or make contacts, of the particular functional modules are input and displayed accordingly.

What is claimed is:

1. A mini-controller comprising:

an intelligent central processing unit;

an operating unit;

a display unit subdivided into a character matrix including a plurality of lines and columns of character positions, each character position having assigned to it a respective one of a plurality of object types, the object types including at least one of an operand object type, a connection object type, and an allocation object type, each object type having a fixed character length; and a memory unit including a non-volatile memory area for storing the object types in an object allocation table, and a volatile memory area for storing a mapping of the character matrix, the mapping being executable by the central processing unit, wherein each of the plurality of object types capable of being linked to another object type so that lines including current paths producing a logic array are formed on the display unit.

2. The mini-controller as recited in claim 1 wherein the mini-controller is a logic relay.

3. The mini-controller as recited in claim 1 wherein each operand object type is designed in the form of at least one of a circuit diagram symbol and a circuit diagram symbol designation.

4. The mini-controller as recited in claim 1 wherein the display unit includes a visible area of four lines.

5. The mini-controller as recited in claim 1 wherein the display unit includes a visible area, and contents of the object allocation table is capable of being scrolled up and down over the visible area.

6. The mini-controller as recited in claim 1 wherein the operating unit includes four positioning keys and four function keys.

7. The mini-controller as recited in claim 1 wherein the connection objects enable adjacent rows and columns to be logically interconnected.

8. The mini-controller as recited in claim 1 further comprising a parameter table for storing a plurality of parameters of a plurality of functional modules.

9. The mini-controller as recited in claim 1 wherein the memory unit includes an interchangeable storage module.

* * * * *